(12) United States Patent
Lai et al.

(10) Patent No.: US 12,367,166 B2
(45) Date of Patent: Jul. 22, 2025

(54) SoC WITH UART INTERFACE

(71) Applicant: REALTEK SEMICONDUCTOR CORPORATION, Hsinchu (TW)

(72) Inventors: Chao-Min Lai, Hsinchu (TW); Yu-Jen Lin, Hsinchu (TW); Hung-Wei Wang, Hsinchu (TW); Huang-Lin Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 79 days.

(21) Appl. No.: 18/229,359

(22) Filed: Aug. 2, 2023

(65) Prior Publication Data

US 2024/0045820 A1 Feb. 8, 2024

(30) Foreign Application Priority Data

Aug. 5, 2022 (TW) .................................. 111129545

(51) Int. Cl.
*G06F 13/14* (2006.01)
*G06F 13/38* (2006.01)

(52) U.S. Cl.
CPC ........ *G06F 13/382* (2013.01); *G06F 2213/38* (2013.01)

(58) Field of Classification Search
None
See application file for complete search history.

(56) References Cited

U.S. PATENT DOCUMENTS

| 5,637,982 | A  | * | 6/1997 | Nanno | H02J 7/007192 |
| | | | | | 320/155 |
| 2012/0159008 | A1 | * | 6/2012 | Park | G06F 13/387 |
| | | | | | 710/15 |
| 2017/0040812 | A1 | * | 2/2017 | Li | H02J 7/00714 |

(Continued)

FOREIGN PATENT DOCUMENTS

| CN | 113127240 A | 7/2021 |
| TW | I733752 B | 7/2021 |

OTHER PUBLICATIONS

OA letter of a counterpart TW application (appl. No. 111129545) mailed on May 4, 2023. Summary of the TW OA letter issued according to the TW counterpart application.

*Primary Examiner* — Henry Tsai
*Assistant Examiner* — Dean Phan
(74) *Attorney, Agent, or Firm* — WPAT, PC

(57) ABSTRACT

A system on a chip (SoC) with a Universal Asynchronous Receiver/Transmitter (UART) interface includes a UART interface circuit, a detection circuit, and a control circuit. The UART interface circuit includes: a plurality of UART signal pads for receiving and transmitting signals; and a UART voltage pad for receiving an external operating voltage. The detection circuit is configured to detect the magnitude of the external operating voltage and thereby generate a detection result. The control circuit is configured to determine setting of a supply voltage for the plurality of UART signal pads according to the detection result. The control circuit makes the setting of the supply voltage be compatible with the external operating voltage according to the detection result, wherein the external operating voltage is a lower first voltage or a higher second voltage, and the first lower voltage is equal to an internal device operating voltage of the SoC.

8 Claims, 1 Drawing Sheet

(56) References Cited

U.S. PATENT DOCUMENTS

| | | |
|---|---|---|
| 2017/0286360 A1 | 10/2017 | Srivastava |
| 2018/0011528 A1* | 1/2018 | Srivastava .......... G06F 13/4282 |
| 2020/0144293 A1* | 5/2020 | Majhi .................... H10B 51/00 |
| 2022/0347398 A1* | 11/2022 | Paramanandam .. A61M 5/5086 |

* cited by examiner

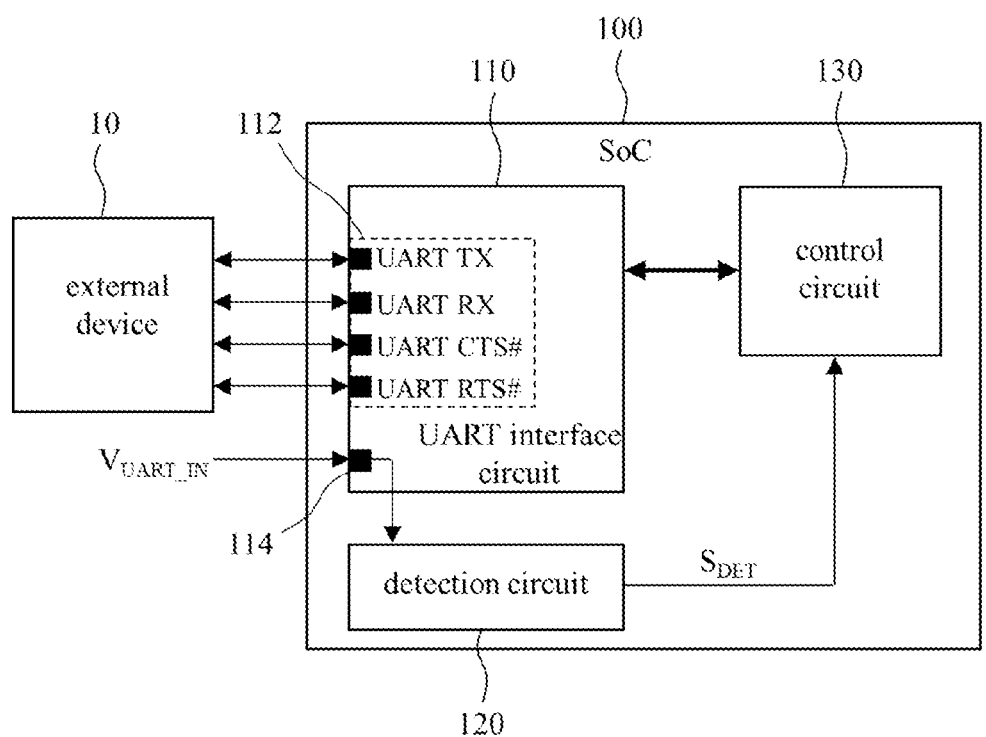

SoC WITH UART INTERFACE

BACKGROUND OF THE INVENTION

1. Field of the Invention

The present disclosure relates to a system on a chip (SoC), especially to an SoC with a Universal Asynchronous Receiver/Transmitter (UART) interface.

2. Description of Related Art

Some system on a chip (SoC) has a Universal Asynchronous Receiver/Transmitter (UART) interface to support an external device (e.g., a Bluetooth device or a microprocessor). When an SoC is connected to the input/output (I/O) pads of a UART interface of an external device through the I/O pads of a UART interface of the SoC, the supply voltage for the I/O pads of the UART interface of the SoC (hereinafter referred to as "the SoC supply voltage") should match the supply voltage for the I/O pads of the UART interface of the external device (hereinafter referred to as "the external-device supply voltage") to prevent the higher one among the two supply voltages from damaging the I/O pads of the device having the lower supply voltage. The collocations between the SoC supply voltage and the external-device supply voltage and the consequences of such collocations are illustrated with the following Table 1.

TABLE 1

| supply voltage for I/O pads | the external-device supply voltage = 1.8 V | the external-device supply voltage = 3.3 V |
|---|---|---|
| the SoC supply voltage = 1.8 V | the SoC successfully drives the external device | the I/O pads of the UART interface of the SoC is at the risk of being burned out |
| the SoC supply voltage = 3.3 V | the I/O pads of the UART interface of the external device is at the risk of being burned out | the SoC successfully drives the external device |

A conventional art is usually used to ensure that the SoC supply voltage matches the external-device supply voltage. This conventional art includes: controlling a UART input voltage for an SoC through the setting of an external resistor and thereby allowing a UART interface of the SoC to directly determine the output and input voltage levels of its own I/O pads according to the UART input voltage (e.g., the UART interface of the SoC using the level of the UART input voltage as the output and input voltage levels); in this case, the SoC does not use its software to control the setting of the supply voltage for the I/O pads.

However, an internal device operating voltage of an SoC manufactured with an advanced semiconductor manufacturing process (e.g., a 12 nm semiconductor manufacturing process or a more advanced semiconductor manufacturing process) is a low voltage (e.g., 1.8V) when the SoC starts up; although in the following procedures the supply voltage for the I/O pads of the SoC can optionally be set for a higher voltage (e.g., 3.3V) or be set for the internal device operating voltage (e.g., 1.8V) to match the supply voltage for the I/O pads of an external device connected with the SoC, the above setting is executed with software of the SoC, and this is not a preferred solution in this technical field.

SUMMARY OF THE INVENTION

An object of the present disclosure is to provide a system on a chip (SoC) with a Universal Asynchronous Receiver/Transmitter (UART) interface, wherein the SoC can adequately determine the setting of a supply voltage for its own UART signal pads.

An embodiment of the SoC of the present disclosure includes a UART interface circuit, a detection circuit, and a control circuit. The UART interface circuit includes: a plurality of UART signal pads for receiving and transmitting signals; and a UART voltage pad for receiving an external operating voltage, wherein the external operating voltage is not generated by the SoC. The detection circuit is electrically coupled with the UART voltage pad and is configured to detect the magnitude of the external operating voltage and thereby generate a detection result. The control circuit is electrically coupled with the detection circuit and is configured to determine the setting of a supply voltage for the plurality of UART signal pads according to the detection result. When the detection result indicates that the external operating voltage is a first voltage, the control circuit makes the setting of the supply voltage be compatible with the first voltage, wherein the first voltage is equal to an internal device operating voltage of the SoC; and when the detection result indicates that the external operating voltage is a second voltage, the control circuit makes the setting of the supply voltage be compatible with the second voltage, wherein the second voltage is higher than the first voltage.

These and other objectives of the present invention will no doubt become obvious to those of ordinary skill in the art after reading the following detailed description of the preferred embodiments that are illustrated in the various FIGURES and drawings.

BRIEF DESCRIPTION OF THE DRAWINGS

FIG. 1 shows an embodiment of the system on a chip (SoC) of the present disclosure.

DETAILED DESCRIPTION OF THE PREFERRED EMBODIMENTS

The present specification discloses a system on a chip (SoC) with a Universal Asynchronous Receiver/Transmitter (UART) interface. The SoC can adequately determine the setting of a supply voltage for its own UART signal pads.

FIG. 1 shows an embodiment of the SoC of the present disclosure. The SoC 100 of FIG. 1 includes a UART interface circuit 110, a detection circuit 120, and a control circuit 130. The SoC 100 is electrically coupled with a UART interface circuit (not shown in FIG. 1) of an external device 10 (e.g., a wireless communication device having a Wi-Fi function and/or a Bluetooth function) through the UART interface circuit 110, and thus a supply voltage for signal pads of the UART interface circuit 110 of the SoC 100 should match a supply voltage for signal pads of the UART interface circuit of the external device 10. To be more specific, the supply voltage for the signal pads of the UART interface circuit 110 of the SoC 100 can optionally be a first voltage (e.g., 1.8V) or a second voltage (e.g., 3.3V), wherein the first voltage is equal to an internal device operating voltage of the SoC 100 and is lower than the second voltage; the supply voltage for the signal pads of the UART interface circuit of the external device 10 is the first voltage or the second voltage; and the SoC 100 makes the setting of the supply voltage for the signal pads of the UART interface circuit 110 of the SoC 100 be compatible with the supply voltage for the signal pads of the UART interface circuit of the external device 10. In this embodiment, the SoC 100 is manufactured with an X nanometer semiconductor manufacturing process, wherein the X is a positive integer/number not greater than twelve; however, the implementation of the present invention is not limited to the above features. The descriptions of the UART interface circuit 110, the detection circuit 120, and the control circuit 130 of the SoC 100 are found in the following paragraphs.

In the embodiment of FIG. 1, the UART interface circuit 110 includes a plurality of UART signal pads 112 and a UART voltage pad 114. The UART interface 110 may include other input/output (I/O) pads according to the demand for implementation. The plurality of UART signal pads 112 are used for receiving and transmitting signals, and include a UART transmission signal pad (UART TX), a UART reception signal pad (UART RX), a UART clear-to-send (CTS) signal pad (UART CTS #), and a UART request-to-send (RTS) signal pad (UART RTS #). The UART transmission signal pad, the UART reception signal pad, the UART clear-to-send signal pad, and the UART request-to-send signal pad are electrically coupled to a UART reception signal pad (not shown) of the external device 10, a UART transmission signal pad (not shown) of the external device 10, a UART request-to-send signal pad (not shown) of the external device 10, and a UART clear-to-send signal pad (not shown) of the external device 10 respectively. Since the functions of the above-mentioned signal pads and the ways of these signal pads receiving and transmitting signals do not interfere with the implementation of the present invention, the functions and the ways fall beyond of the scope of the present disclosure. The UART voltage pad 114 is used for receiving an external operating voltage $V_{UART\_IN}$ that is not generated by the SoC 100; for example, the external operating voltage $V_{UART\_IN}$ is originated from a general/specific external circuit board (not shown in FIG. 1) and is determined according to the output and input voltages of the signal pads of the UART interface circuit of the external device 10, wherein both the SoC 100 and the external device 10 are set on the external circuit board.

In the embodiment of FIG. 1, the detection circuit 120 is electrically coupled with the UART voltage pad 114 and is configured to detect the magnitude of the external operating voltage $V_{UART\_IN}$ and thereby generate a detection result $S_{DET}$. For example, the detection circuit 120 includes a known/self-developed analog-to-digital converter (ADC) (e.g., a low speed ADC (LSADC)) (not shown) which is configured to generate the detection result $S_{DET}$ according to the magnitude of the external operating voltage $V_{UART\_IN}$, wherein the ADC can be inherent in the SoC 100 (e.g., an LSADC for handling the input of keyboard signals) or be an additional ADC added to the SoC 100 for realizing the present invention. For example, the detection circuit 120 includes a known/self-developed comparator (not shown) which is configured to compare the external operating voltage $V_{UART\_IN}$ with at least one predetermined voltage (e.g., a voltage between 1.8V and 3.3V) and thereby generate the detection result $S_{DET}$, wherein the comparator can be an additional comparator added to the SoC 100 for realizing the present invention.

In the embodiment of FIG. 1, the control circuit 130 is electrically coupled with the detection circuit 120 and is configured to determine the setting of a supply voltage for the plurality of UART signal pads 112 according to the detection result $S_{DET}$, wherein the supply voltage can be understood as a direct-current (DC) voltage level for the plurality of UART signal pads 112. As stated in the preceding paragraph, the internal device operating voltage of the SoC 100 is the lower first voltage instead of the higher second voltage; when the detection result S DET indicates that the external operating voltage $V_{UART\_IN}$ is the first voltage, the control circuit 130 determines that the setting of the supply voltage is compatible with the first voltage; and when the detection result S DET indicates that the external operating voltage $V_{UART\_IN}$ is the second voltage, the control circuit 130 determines that the setting of the supply voltage is compatible with the second voltage. In brief, the control circuit 130 makes the setting of the supply voltage be compatible with the external operating voltage $V_{UART\_IN}$ according to the detection result $S_{DET}$.

In the embodiment of FIG. 1, the control circuit 130 executes software to determine the setting of the supply voltage according to the detection result $S_{DET}$. For example, the control circuit 130 includes a processor, a memory, and so on (not shown in FIG. 1) of the SoC 100 for executing the software; the software is a UART driver for the SoC 100; the setting of the supply voltage is represented by a value stored in a register (not shown in FIG. 1); when the value stored in the register is lower than a predetermined threshold value, the software makes an output/input voltage (i.e., the supply voltage for the plurality of UART signal pads 112) be the first voltage; and when the value stored in the register is higher than the predetermined threshold value, the software makes the output/input voltage be the second voltage. The SoC 100 includes a known/self-developed boost circuit (not shown in FIG. 1) for providing the required supply voltage, and the SoC 100 optionally outputs one of the first voltage and the second voltage as the supply voltage through a switch (not shown) according to the value stored in the register and thereby provides the supply voltage for the plurality of UART signal pads 112.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the SoC of the present disclosure can detect an external operating voltage and thereby adequately determine the setting of a supply voltage for UART signal pads of the SoC.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An integrated circuit (IC) including a system on a chip (SoC), the SoC comprising:
   a Universal Asynchronous Receiver/Transmitter (UART) interface circuit including:
   a plurality of UART signal pads for receiving and transmitting signals; and
   a UART voltage pad for receiving an external operating voltage, wherein the external operating voltage is not generated by the SoC;
   a detection circuit electrically coupled with the UART voltage pad and configured to detect a magnitude of the external operating voltage and thereby generate a detection result; and a control circuit electrically coupled with the detection circuit and configured to determine setting of a supply voltage for the plurality of UART signal pads according to the detection result, wherein an internal device operating voltage of the SoC is a first voltage; when the detection result indicates that the external operating voltage is the first voltage, the control circuit makes the setting of the supply voltage be compatible with the first voltage; when the detection result indicates that the external operating voltage is a second voltage, the control circuit makes the setting of the supply voltage be compatible with the second voltage; and the second voltage is higher than the first voltage; and wherein the control circuit is configured to execute software and thereby determine the setting of the supply voltage according to the detection result; the software is executed to compare a value stored in a register with a predetermined threshold value; when the value stored in the register is lower than the predetermined threshold value, the software is executed to set output and input voltages of the plurality of UART signal pads for the first voltage; and when the value stored in the register is higher than the predetermined threshold value, the software is executed to set the output and input voltages of the plurality of UART signal pads for the second voltage.

2. The IC of claim 1, wherein the detection circuit includes an analog-to-digital converter for generating the detection result according to the magnitude of the external operating voltage.

3. The IC of claim 1, wherein the detection circuit includes a comparator for comparing the external operating voltage with at least one predetermined voltage and thereby generating the detection result.

4. The IC of claim 1, wherein the SoC is an SoC of an X nanometer integrated circuit process, and the X is a positive integer not greater than 12.

5. The IC of claim 4, wherein the first voltage is 1.8 volts, and the second voltage is 3.3 volts.

6. The IC of claim 1, wherein the plurality of UART signal pads include a UART transmission signal pad, a UART reception signal pad, a UART clear-to-send (CTS) signal pad, and a UART request-to-send (RTS) signal pad.

7. The IC of claim 6, wherein the SoC is electrically coupled with an external device through the plurality of UART signal pads, the external operating voltage is originated from an external circuit board, and after the control circuit determines the setting of the supply voltage, the supply voltage is the same as the external operating voltage.

8. The IC of claim 7, wherein the external device is a wireless communication device.

\* \* \* \* \*